United States Patent Office 2,808,550
Patented Oct. 1, 1957

2,808,550

SERVOSYSTEM INCLUDING PHASE SENSITIVE AMPLIFIER

Charles S. Carney, Marion, Iowa, assignor to Collins Radio Company, Cedar Rapids, Iowa, a corporation of Iowa Application October 12, 1953, Serial No. 385,578

2 Claims. (Cl. 318—30)

This invention relates generally to phase selectors and particularly to an electronic circuit which rectifies an in-phase signal voltage and rejects an out-of-phase signal voltage.

A phase selector is defined herein as a circuit which only passes signal voltages that are in-phase with a reference voltage. The in-phase signal may be rectified as it is passed.

A plurality of phase selectors may be used to selectively pass any number of signals with different phases.

Servo systems often use phase selectors to control the direction of rotation of their output shafts.

One method of servo direction regulation is phase control of error voltage. An in-phase voltage calls for rotation in one direction, and an 180 degree out-of-phase error voltage corresponds to rotation in the opposite direction of a servo output shaft.

Amplification of error voltage is generally required to obtain sufficient power for servo operation. Phase relationships are often lost in the various amplification stages and must be reestablished before directional control can be obtained.

It is therefore an object of this invention to reestablish the phase relationship of a signal after amplification.

Some servo systems have output circuits that contain direct current motors or direct current magnetic amplifiers with alternating current motors. These servo systems require rectification after the error signal has been amplified. The polarity of the rectified voltage must correspond to the phase of the alternating error voltage in order to retain direction control.

It is another object of this invention to electrically interlock the phase of the input error voltage and the polarity of a rectified output voltage.

Servo systems are oftentimes operated on 60 or 400 cycles power supplies and prior low frequency rectifiers have generally required transformer coupling with prior stages.

It is therefore another object of this invention to provide direct coupling between a rectifier and a preceding amplifier. Expensive coupling devices are thereby avoided.

It is another object of this invention to provide direct current power amplification during rectification by the use of an alternating reference voltage.

A feature of this invention is found in the provision for a selector tube which has the output of an amplifier connected to its control grid and an alternating reference voltage connected to its screen grid. The alternating control grid voltage is rectified when in phase with the reference voltage and is cancelled when of opposite phase.

Further objects, features and advantages of this invention will become apparent to a person skilled in the art upon further study of the specification and drawings, in which.

A pair of selector tubes are used in the embodiment described herein. They control the direction of rotation of a servo output shaft.

Figure 1:
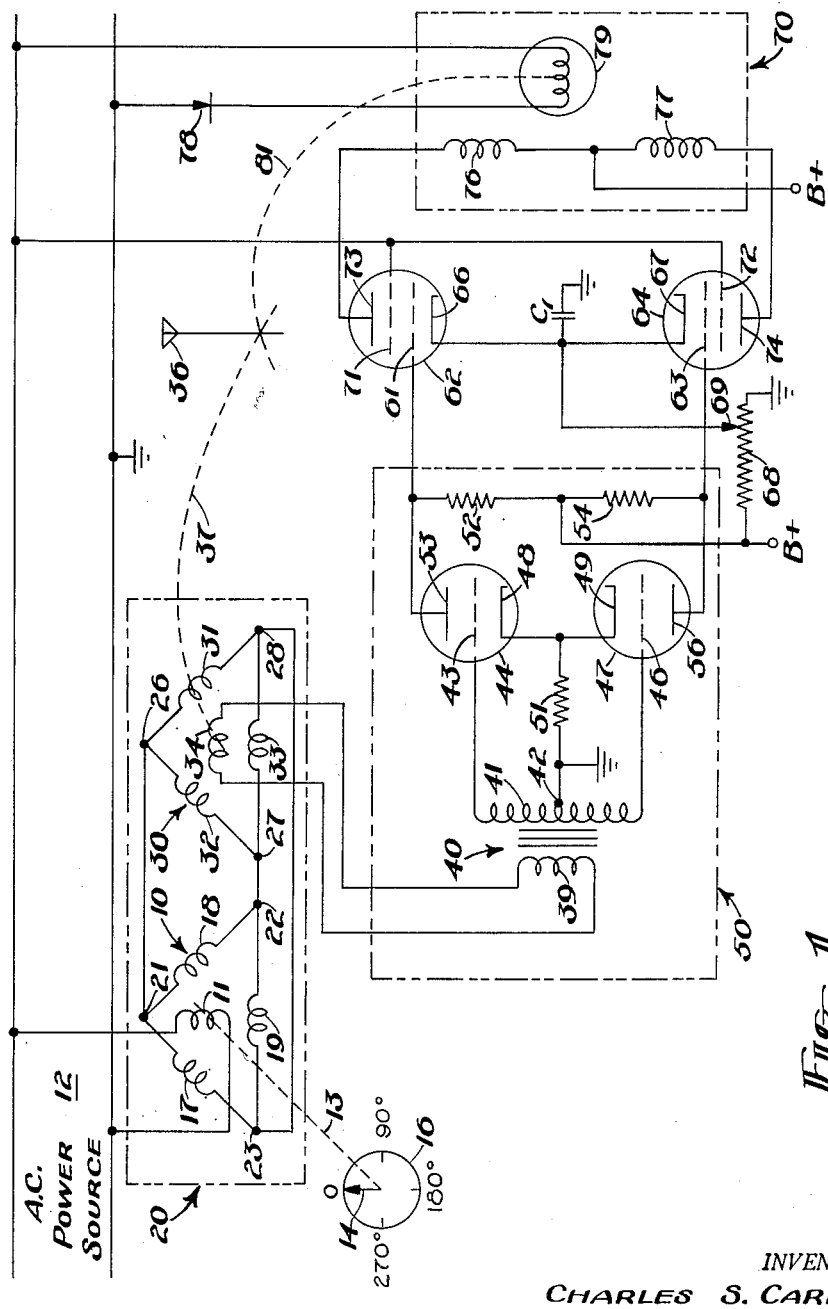
Figure 1 is a schematic diagram of a servo system that contains this invention.

Figure 1 shows a servo system which includes this invention. A synchro control transformer 20 provides the sensing means for the servo system and includes a transmitter synchro 10 which has its rotor 11 connected across an alternating current power source 12 that might be a 110 volt, 60 cycle source. Rotor 11 is connected to an indicator knob 14 by a shaft 13. The knob indicates the position of shaft 13 on a fixed dial 16 that might be graduated in degrees of rotation.

Synchro transformer 20 also includes a receiver synchro 30 which is the same as transmitter synchro 10.

The three stator coils 17, 18 and 19 of synchro 10 have three output terminals 21, 22 and 23 which are connected respectively to the three input terminals 26, 27 and 28 of receiver synchro 30. Synchro 30 has stator coils 31, 32 and 33.

The receiver synchro rotor 34 is connected by a control shaft 37 to an antenna 36.

The error voltage output of sensing means 20 is connected to the input terminals of an amplifier 50. Rotor 34 provides the output for sensing means 20 and is connected across the primary 39 of a signal transformer 40 within amplifier 50.

The secondary 41 of transformer 40 has its center tap 42 grounded and has one side connected to the grid 43 of a first amplifier tube 44. The other side of secondary 41 is connected to the grid 46 of a second amplifier tube 47. The cathodes 48 and 49 of the first and second amplifier tubes are connected together and grounded through a cathode resistor 51.

A first load resistor 52 is connected between the plate 53 of tube 44 and a B plus supply, and a second load resistor 54 is connected between the plate 56 of tube 47 and the B plus power supply.

The control grid 61 of a first selector tube 62 is connected to plate 53 of tube 44, and the control grid 63 of a second selector tube 64 is connected to plate 56 of tube 47.

A voltage divider 68 is connected between the B plus power supply and ground, and its adjustable tap 69 is connected to the cathodes 66 and 67 of selector tubes 62 and 64. A condenser $C_1$ is connected between the cathodes 66 and 67 and ground to provide a bypass to ground.

The screen grids 71 and 72 of selector tubes 62 and 64 are both connected to one side of the alternating voltage power source 12.

The plates 73 and 74 of selector tubes 62 and 64 are respectively connected to opposite ends of the reversing field coils 76 and 77 of a direct current motor 70. The common point between coils 76 and 77 is connected to the B plus power supply.

The armature 79 of motor 70 is connected across the alternating power source 12, and a rectifier 78 provides unidirectional current to armature 79.

Motor 70 will rotate in one direction when a direct current of one polarity is passed through soil 76 and will rotate in the opposite direction when a direct current of opposite polarity is passed through coil 77.

The armature of motor 79 is mechanically coupled to antenna 36 by an output shaft 81.

The servo system in Figure 1 causes antenna 36 to assume an angular setting which corresponds to the angular setting of indicator knob 14.

Assume that antenna 36 and knob 14 are in corresponding positions. Then there will be no error voltage transmitted to transformer 40.

When it is desired to move antenna 36 to a new position, knob 14 is manually set to a new angle which, for example, might be 310 degrees.

Conventional synchro systems of the type shown transmit an error signal which has a phase that corresponds to the direction of rotation that will turn the antenna through the smallest angle to correspond with the position of the control knob. In the example this would be 50 degrees.

It is well known that the output of a synchro control transformer can only be in phase or 180 degrees out of phase with the source power. Primary 39 will therefore receive an error voltage with one or two possible phases that have a correlation to the direction of least rotation.

Secondary 41 of transformer 40 provides phase inversion for push-pull amplifier 50 which is also conventional. The input signal is thereby changed into two equal voltages of opposite phase and amplified. The phase of the output voltages from tubes 44 and 47 is again inverted and is placed directly upon control grids 61 and 63 of selector tubes 62 and 64.

At this point the initial phase of the signal is lost due to the phase inversions in the amplifiers. An in-phase voltage will exist at one amplifier output point and an out-of-phase voltage will exist at the other amplifier output point. The phase of the amplifier outputs will reverse when a phase reversal occurs in error signal.

Figure 2:
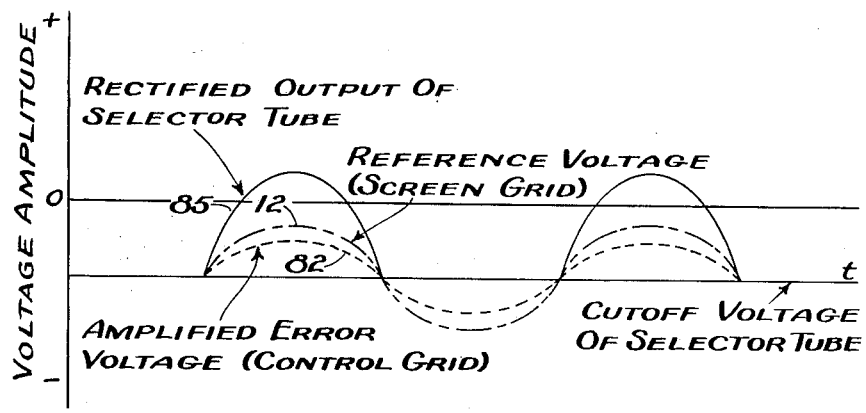
Figure 2 shows the instantaneous voltage relationship in one selector tube; and, Figure 3 shows the instantaneous voltage relationship in the other selector tube.
Figure 3:
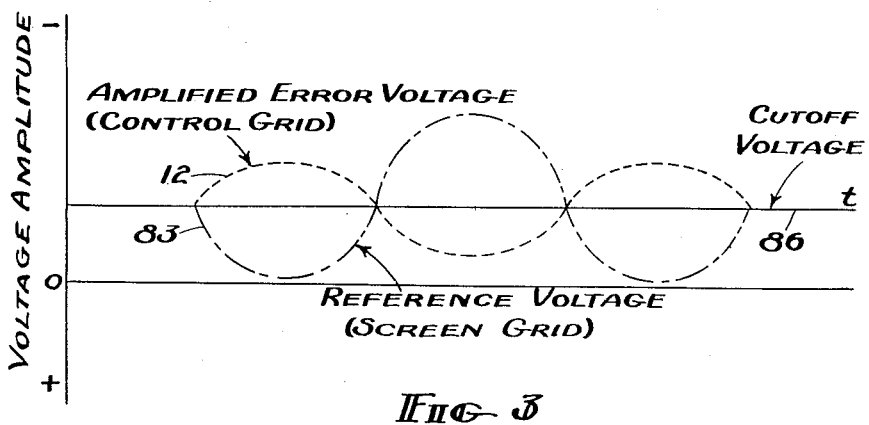

The selector tubes detect, amplify and rectify the amplifier output which is in phase with the initial error voltage, see Figures 2 and 3.

The voltage 12 on screen grids 71 and 72 is the source voltage. However, the voltage 82 on one selector tube control grid is in-phase with the source while the voltage 83 on the other selector tube control grid is out-of-phase with the source.

The selector tube with the in-phase grid voltages produces a large amplified output 85, and the selector tube with the out-of-phase grid voltages produces no output as indicated by numeral 86. Circuit output is therefore switched between the selector tubes by the changes in phase of the error signal input.

The tubes 62 and 64 are biased by tap 69 to cut-off. Only the positive loops of input voltage appear as output from the selector tubes and provide the rectified output.

Figures 2 and 3 show the instantaneous voltage relationships for the selector tubes. For example, an error voltage across primary 39 that is in-phase with reference voltage 12 on the screen grids, causes tube 62 to produce the large rectified output voltage 85 shown in Figure 2 and causes tube 64 to produce the substantially zero output voltage 86 shown in Figure 3.

On the other hand, an error voltage of opposite phase produces the additive voltage relations of Figure 2 in tube 64 and the subtractive voltage relations of Figure 3 in tube 62.

An output from tube 62 energizes coil 76 and causes motor armature 79 to rotate in one direction, and an output from tube 64 energizes coil 77 and causes motor 70 to rotate in the opposite direction.

Antenna 36 is thereby rotated in a direction which corresponds to the phase of the error voltage from sensing means 20. A gear reduction may, of course, be used between the output of motor 70 and antenna 84 to multiply the torque of motor 70.

This invention therefore provides a direct current output which has a polarity that follows the phase of the input error voltage, and the direction of rotation of a servo output shaft accordingly responds to the phase of the error voltage.

It is also seen that this invention provides direct coupling to the selector tubes which avoids expensive coupling means. Furthermore, the selector tubes amplify the direct current output by means of the additive effect of the alternating reference voltage.

It is understood that the selector tubes may be operated with the control grid voltage entirely above cut-off. The output of the selector tubes will then be an alternating voltage with a phase that corresponds to the phase of the error voltage.

Although this invention has been described with respect to particular embodiments thereof, it is not to be so limited as changes and modifications may be made therein which are within the full intended scope of the invention, as defined by the appended claims.

I claim:

1. An intermediate circuit in a servo system that also includes, a sensing means that produces an alternating error voltage which is phased with an alternating reference voltage according to the required rotational direction of the servo output shaft, a push-pull amplifier connected to the output of said sensing means and having a pair of electron tubes, and a driving means for said output shaft that is reversed by opposite polarity direct current signals comprising, a pair of selector tubes with the control grid of each directly connected to an opposite plate of the tubes of the amplifier, the screen grids of said selector tubes connected to said reference voltage, a potentiometer connected between a B plus voltage and ground, the tap of said potentiometer connected to the cathodes of said selector tubes, and the plates of said selector tubes connected to said driving means to selectively provide opposite polarity direct voltage outputs that drive said driving means in a direction that corresponds to the phase of said error voltage.

2. A direct coupled phase selector having a preceding push-pull amplifier that receives an alternating signal either in-or-out of phase with an alternating reference voltage, wherein said amplifier has opposite electron tubes which provide signals of opposite phase, comprising first and second selector tubes, each having a pair of grids, said first selector tube having one grid directly connected to the plate of one tube of said push-pull amplifier, the second selector tube having one grid directly connected to the plate of the other tube of said push-pull amplifier, a polarity sensitive load connected between the plates of said selector tubes, a positive direct-voltage power supply connected through said load to the plates of said selector tubes, impedance means also connecting said positive direct-voltage power supply to the plates of the push-pull amplifier tubes, the other grid of each selector tube being connected to the alternating-reference voltage, and means for normally biasing said grids of each selector tube below cutoff.

References Cited in the file of this patent

UNITED STATES PATENTS

| 2,371,415 | Tolson | Mar. 13, 1945 |
| 2,399,695 | Satterlee | May 7, 1946 |
| 2,530,387 | Goertz | Nov. 21, 1950 |
| 2,569,268 | Wild | Sept. 25, 1951 |
| 2,598,221 | Burton | May 27, 1952 |

OTHER REFERENCES

"Electronics," Feb. 1954, pp. 188–192.

"Electronic Instruments," page 441, Figs. 12–59, Greenwood, Holdam, Macrae, McGraw-Hill, New York, 1948.